(12) United States Patent
Gerlach et al.

(10) Patent No.: US 11,117,176 B2
(45) Date of Patent: Sep. 14, 2021

(54) ONE-PIECE STUD AND CLIP

(71) Applicant: ILLINOIS TOOL WORKS INC., Glenview, IL (US)

(72) Inventors: Todd Gerlach, Hendersonville, TN (US); Nicholas Capito, Jr., Gallatin, TN (US); Hector A. Molina, Gallatin, TN (US)

(73) Assignee: Illinois Tool Works Inc., Glenview, IL (US)

( * ) Notice: Subject to any disclaimer, the term of this patent is extended or adjusted under 35 U.S.C. 154(b) by 169 days.

(21) Appl. No.: 15/522,871

(22) PCT Filed: Nov. 6, 2015

(86) PCT No.: PCT/US2015/059439
§ 371 (c)(1),
(2) Date: Apr. 28, 2017

(87) PCT Pub. No.: WO2016/077170
PCT Pub. Date: May 19, 2016

(65) Prior Publication Data
US 2017/0335879 A1 Nov. 23, 2017

Related U.S. Application Data

(60) Provisional application No. 62/078,440, filed on Nov. 12, 2014.

(51) Int. Cl.
*B21D 53/36* (2006.01)
*B21D 11/10* (2006.01)
*F16B 37/02* (2006.01)
*F16B 37/04* (2006.01)

(52) U.S. Cl.
CPC .......... *B21D 11/10* (2013.01); *B21D 53/36* (2013.01); *F16B 37/02* (2013.01)

(58) Field of Classification Search
CPC ........ B21D 53/36; B21D 53/00; B21D 11/10; B21D 11/20
USPC .......................................... 470/25; 72/379.2
See application file for complete search history.

(56) References Cited

U.S. PATENT DOCUMENTS

| | | | |
|---|---|---|---|
| 2,286,696 A | 6/1942 | Tinnerman | |
| 2,618,824 A | 11/1952 | Poupitch | |
| 4,266,310 A * | 5/1981 | Perrault | B21D 53/36 |
| | | | 470/25 |
| 4,396,328 A * | 8/1983 | Barnes | B21D 53/36 |
| | | | 411/211 |
| 4,423,616 A | 1/1984 | Pease | |
| 4,470,716 A * | 9/1984 | Welch | F16B 12/38 |
| | | | 72/379.2 |

(Continued)

FOREIGN PATENT DOCUMENTS

GB    2235239 A    2/1991

OTHER PUBLICATIONS

ISR and WO for PCT/US2015/059439 dated Jan. 27, 2016; 12 pages.

*Primary Examiner* — Teresa M Ekiert
(74) *Attorney, Agent, or Firm* — Quarles & Brady LLP

(57) ABSTRACT

A one-piece stud and clip is provided by a process working sheet material into a monolithic stud and U-clip fastener. The process includes forming an elongated stud from the sheet material, and bending the sheet material to form the clip. The stud can be a rolled cylinder of the sheet material, or an uninterrupted stud drawn from the sheet material.

7 Claims, 6 Drawing Sheets

(56) References Cited

U.S. PATENT DOCUMENTS 4,570,885 A * 2/1986 Heath .................... B21D 53/36
  72/379.2
4,646,395 A * 3/1987 Mayszak ................ B21D 53/36
  24/135 R

* cited by examiner

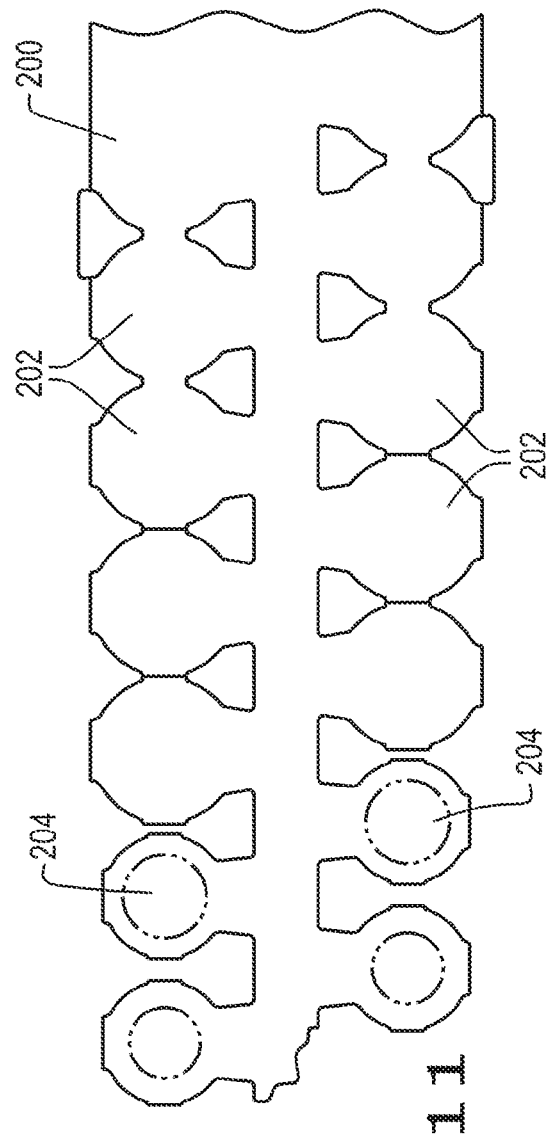
Fig. 11
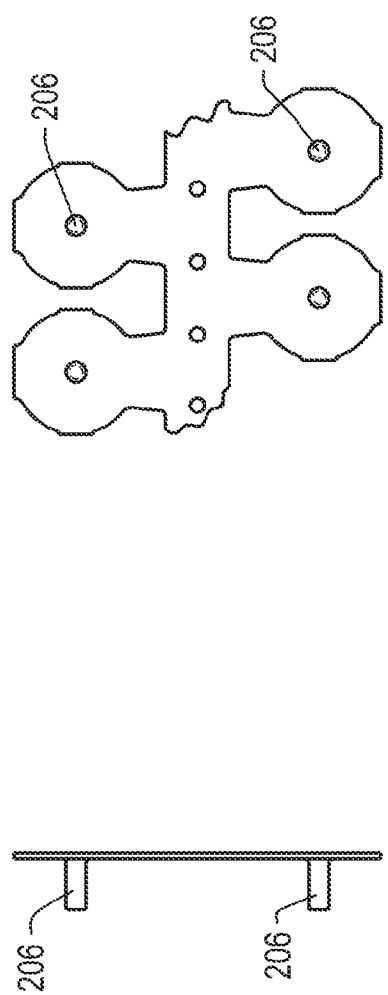
Fig. 12
Fig. 13

ONE-PIECE STUD AND CLIP

RELATED APPLICATIONS

The present application is a National Phase of International Application Number PCT/US2015/059439 filed Nov. 6, 2015 and claims priority of U.S. Provisional Application No. 62/078,440 filed Nov. 12, 2014.

FIELD OF THE INVENTION

The present invention relates generally to panel fasteners, and, more particularly, to a type of fastener having a U-clip for attaching to an edge of a panel and a threaded stud for attaching another component in an assembly.

BACKGROUND OF THE INVENTION

Automobiles, appliances and other assemblies use many different types of fasteners for attaching components. In some such assemblies, a panel or panel portion of a subassembly is fastened to another assembly component by a threaded fastener. It is known to provide a U-clip to engage an edge of the panel, and a threaded stud cooperating with the U-clip either as separate parts operating together or with the stud physically attached to the U-clip for securing to the other component. Known fasteners of this type are made of multiple pieces in a relatively complex manufacturing process requiring different techniques for different parts of the fastener. For example, it is known to provide a spring U-clip formed from sheet metal by known bending techniques, and a separate threaded stud formed by known threading techniques. In one known structure, the stud is clinched to the U-clip. In another known structure, the stud is staked to or otherwise connected to the spring U-clip.

While such fasteners have performed acceptably to some extent, known fasteners of this type are not without disadvantages. The multiple material forming techniques required for the U-clip and stud add to manufacturing costs, and the required steps of clinching, staking or other steps for attaching the stud to the U-clip adds both cost and complexity. Separate manufacturing processes require that at least one of the U-clip and stud be transported to a location where one is attached to the other. Staking or clinching the stud to the U-clip requires a separate machine and operator. A staking or clinching operation can fail, leading to an inaccurately or inadequately attached stud, which may be difficult or impossible to use, or which may fail during use.

An assembly such as an automobile or an appliance can use a large number of such fasteners. As a result, panel fasteners of this type can comprise a significant cost item in the overall assembly, even when an individual fastener is relatively inexpensive.

What is needed in the art is a one-piece stud and clip structure that can be manufactured easily at minimal cost.

SUMMARY OF THE INVENTION

The one-piece stud and clip disclosed herein provides a fastener having a spring U-clip and a threaded stud formed from a single piece of sheet metal using known material forming techniques. A single piece of sheet metal is used to form both a U-clip and a threaded stud as a single monolithic body. The one-piece stud and clip can be made by commonly used and well-known material forming processes, such as stamping or metal drawing processes. In one embodiment, threads are pressed into the stud portion of the fastener.

The fastener disclosed herein can be used to retain mating panels together while the threaded stud is to provide permanent, but serviceable joining of the two mating pieces it retains. Since the structure is a monolithic body, the potential for an assembled stud and U-clip to become separated due to improper or inadequate staking or other attaching of the stud to the U-clip is eliminated. The potential for the assembled stud to spin out or break loose during installation is eliminated. The fastener is lightweight, thereby resulting in net energy savings during manufacture, transport and assembly.

In one aspect hereof, a one-piece stud and clip fastener is provided with a stud portion and a clip portion that are a monolithic body of material. The stud portion is an elongated, generally cylindrical protrusion. The clip portion is connected to the stud portion by a folded region in the monolithic body of material.

In another aspect hereof, a process for making a one-piece stud and U-clip fastener from a flat sheet of material is provided with steps that include shaping the sheet of material; forming a first area of the shaped material into an elongated stud portion; and bending a second area of the shaped material to form a clip portion integral with the stud portion.

Other features and advantages of the invention will become apparent to those skilled in the art upon review of the following detailed description, claims and drawings in which like numerals are used to designate like features.

BRIEF DESCRIPTION OF THE DRAWINGS

FIG. 11 is a top view illustrating the condition of a sheet of material during initial steps in another process for forming a one-piece stud and clip;

FIG. 12 is a top view illustrating the condition of a sheet of material during another step in the process for forming a one-piece stud and clip, following the condition illustrated in FIG. 11;

FIG. 13 is an elevational view of the material at the step shown in FIG. 12;

Figure 1:
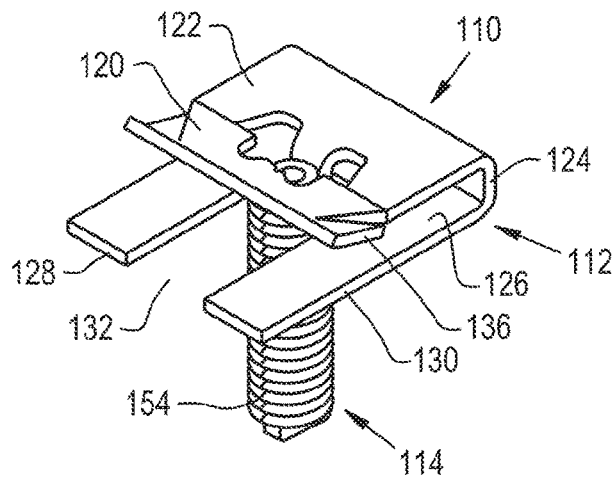
FIG. 1 is an isometric view from one side of a one-piece stud and clip disclosed herein.
Figure 2:
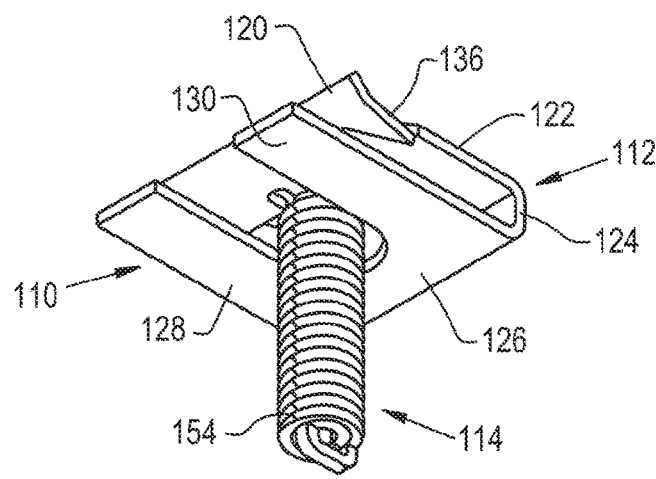
FIG. 2 is an isometric view from generally an opposite side of the one-piece stud and clip from the side shown in FIG. 1.
Figure 3:
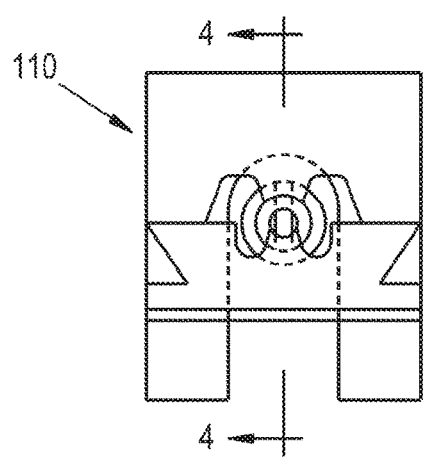
FIG. 3 is an elevational view from one end of the one-piece stud and clip.
Figure 4:
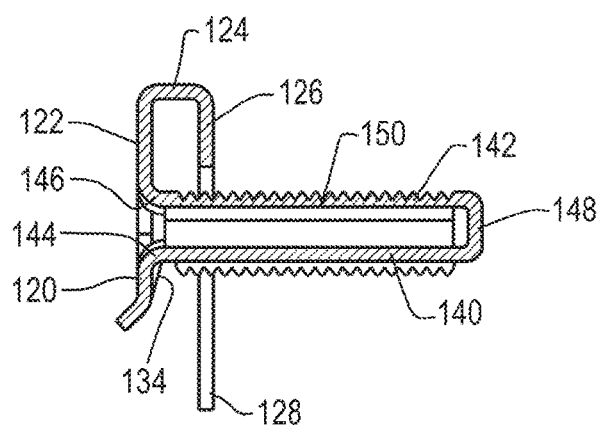
FIG. 4 is a cross-sectional view of the one-piece stud and clip shown in FIG. 3, the cross-section taken along line 4-4 of FIG. 3.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 6:
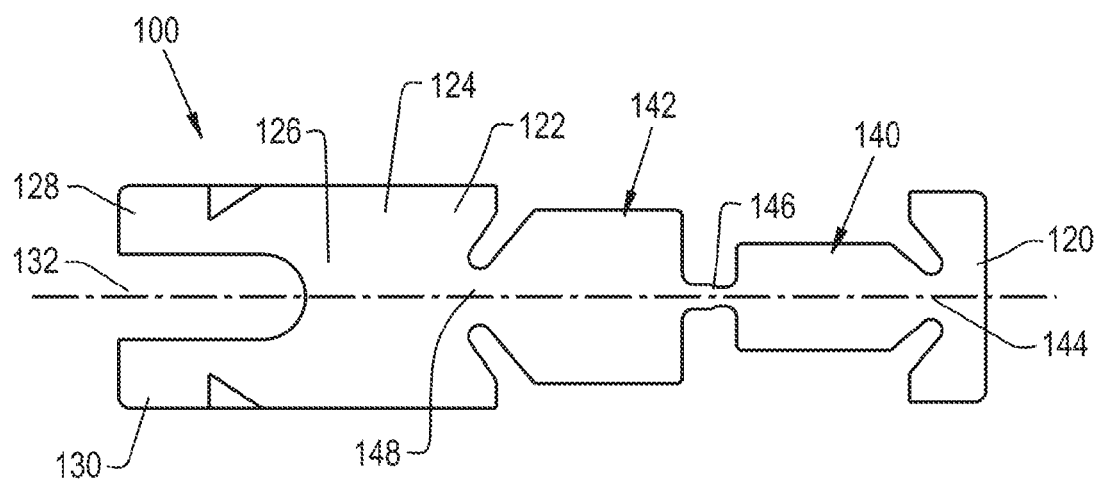
FIG. 6 is a plan view of a flat sheet metal blank after trimming and punching from which the one-piece stud and clip can be formed.
Figure 7:
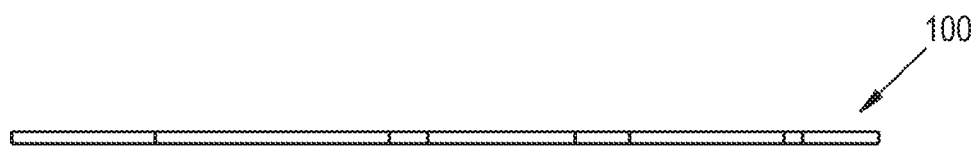
FIG. 7 is side view of the flat sheet metal blank shown in FIG. 6.
Figure 8:
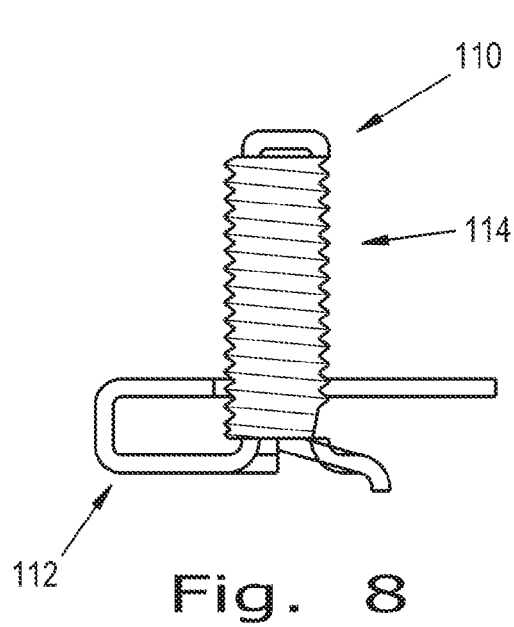
FIG. 8 is a side elevational view of the one-piece stud and clip.
Figure 9:
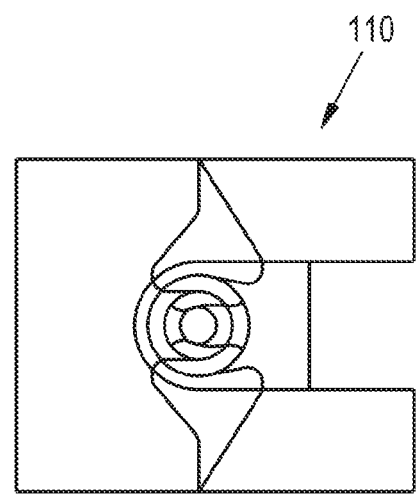
FIG. 9 is an elevational of the end of the one-piece stud and clip, opposite the end shown in FIG. 3.

Referring now more specifically to the drawings and to FIGS. 1-4 in particular, a one-piece stud and clip 110 is shown. The one-piece stud and clip 110 includes an integrally formed combination of a U-clip portion 112 and a threaded stud portion 114. U-clip portion 112 and threaded stud portion 114 are formed from a monolithic body of sheet material that is bent, formed and processed to form the single piece clip and stud. FIGS. 6 and 7 show a stamped, cut and trimmed blank 100 of flat sheet material from which one-piece stud and clip 110 is formed by appropriate bending techniques. The techniques required for stamping, cutting, shaping and bending are known sheet metal handling processes that are practiced and known by those skilled in the art for the manufacture of many other things.

More specifically, a piece of sheet metal is fed from a roll through a die in which it is punched, cut and trimmed to form blank 100 as a discrete piece separate from the material on the roll. Another series of operations bends some areas of the blank 100 relative to other areas of the blank 100 to form the U-clip portion 12, while also rolling still other areas of the blank 100 to form the threaded stud portion 114.

With reference to regions on blank 100 as shown in FIG. 6, U-clip portion 112 includes and is formed from a top leg distal portion 120, a top leg proximal portion 122, a top to bottom transition 124, a bottom leg proximal portion 126 and first and second bottom leg distal portions 128, 130 defining s slot 132 therebetween. Top leg distal portion 120 further includes edge tabs or barbs 134, 136.

Also with reference to regions on blank 100 as shown in FIG. 6, threaded stud portion 114 includes and is formed from material in blank 100 that is generally disposed between top leg distal portion 120 and top leg proximal portion 122 within blank 100. Accordingly, threaded stud portion 114 includes an internal cylinder 140 and an external cylinder 142. Internal cylinder 140 is connected to top leg distal portion 120 by a distal upper transition segment 144, and external cylinder 142 is connected to top leg proximal portion 122 by a proximal upper transition segment 146. Internal cylinder 140 and external cylinder 142 are connected to each other by a lower transition 148. External cylinder 142 is provided with a stamped thread 150 on the surface forming the exterior thereof in the completed fastener.

Figure 5:
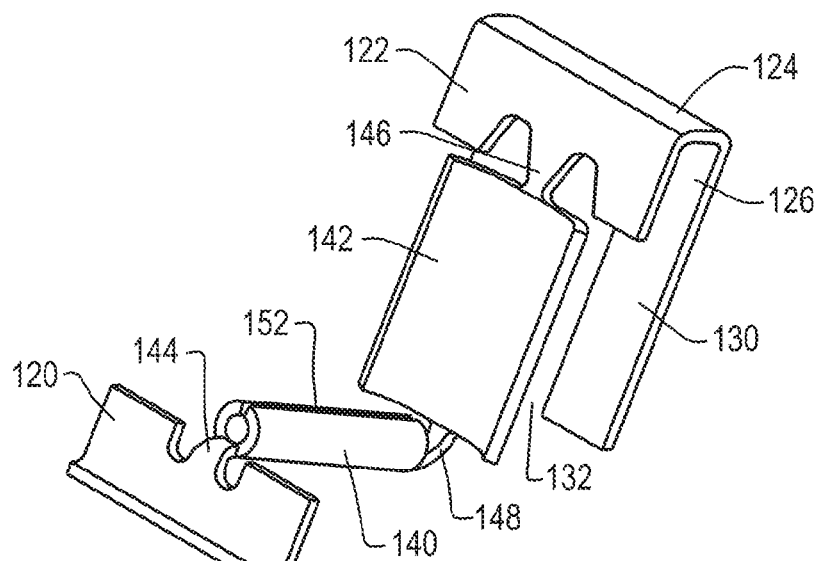
FIG. 5 is a perspective view of the one-piece stud and clip at a stage of partial manufacture.

As seen in FIG. 5, internal cylinder 140 is rolled inwardly from the outer edges thereof to form an internal supporting cylinder having the outer edges thereof adjacent each other to define a minimal space 152 therebetween, space 152 extending along the length of the formed internal cylinder 140. Top leg distal portion 120 is positioned substantially at right angles to internal cylinder 140 by bending at distal upper transition segment 144. External cylinder 142 is wrapped around internal cylinder 140 by bending at lower transition 148 and rolling the lateral edges of external cylinder 142 toward one another. The external edges are adjacent each other to define a minimal space 154 therebetween, space 154 extending along the length of the formed external cylinder 142. Spaces 152 and 154 are positioned substantially diametrically opposite one another along the lengths of internal cylinder 140 and external cylinder 142, respectively. Accordingly, the double walled thickness of threaded stud portion 114 in the completed fastener provides sufficient strength for fastening with female threaded fasteners such as conventional threaded nuts. The formed double walled cylinder can pass through slot 132 between bottom leg distal portions 128, 130 so that top leg proximal portion 122 is substantially at right angles to external cylinder 142 as a result of bending at proximal upper transition segment 146.

U-clip portion 112 is completed by bending at top to bottom transition 124 such that the top leg portions and bottom leg portions extend in spaced, confronting relation relative to one another, generally surrounding threaded stud portion 114 extending there through. Edge tabs or barbs 134, 136 are bent downwardly toward bottom leg distal portions 128, 130.

Advantageously, threads 150 can be formed by stamping or coining using conventional equipment used for otherwise manipulating and forming one-piece stud and clip 110. Stamping and coining are merely examples of suitable process for forming threads 150; however, it should be understood that threads also can be formed by other techniques suitable for the material, including thread cutting processes.

Figure 10:
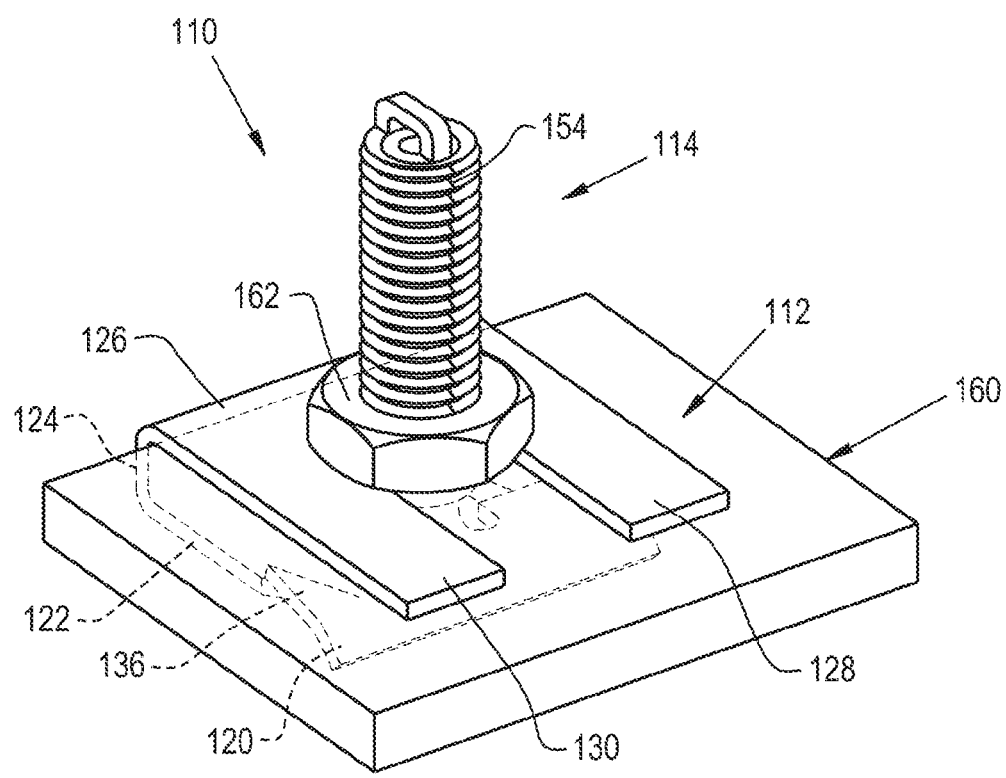
FIG. 10 is a perspective illustration of the one-piece stud and clip in use.

As shown in FIG. 10, one-piece stud and clip 110 can be fastened to a panel 160 having a channel extending inwardly from an edge thereof. Clip portion 112 is slid over panel 160 such that top leg distal and proximal portions 120, 122 are on one surface of panel 160 and bottom leg proximal and distal portions 126, 128 are on an opposite surface of panel 160. Threaded stud portion 114 slides through the channel extending inwardly from the edge of panel 160. Thereafter, a nut 162 is threadedly engaged on the stamped or otherwise formed thread 150 of threaded stud portion 114 thereby drawing the top and bottom leg portions toward one another and clamping one-piece stud and clip 110 on to panel 160. Thereafter, another panel or component (not shown) of other type can be secured relative to panel 160 by typical bolt and nut fastening using threaded stud portion 114 and a second nut (not shown) or by applying the other panel or component on the threaded nut portion 114 before attachment of nut 162. Alternatively, another component having a complementary female thread can be directly engaged on threaded stud portion 114.

A one-piece stud and clip also can be formed using metal drawing processes known in the material forming arts, together with stamping, threading and bending processes. FIGS. 11-13 illustrate a process in which a blank sheet of material 200 is first cut, stamped or otherwise shaped into a series of connected stud portion pre-forms 202 configured to provide material in a shape to allow gathering of the material to form the studs by a metal drawing process. As shown in FIG. 11, the initial stud portion pre-forms 202 are generally rounded and closely spaced. Initial stud portion protrusions 204 are drawn outward and progressively shaped and elongated in a series of cavities to form elongated projections, or stud portion studs 206 having the required final length (FIG. 13). As the drawing process progresses to form studs 206, pre-forms 202 contract due to the gathering and drawing operations. Accordingly, the spaces between pre-forms 202 increase as studs are elongated to the final lengths thereof. Unlike the rolled cylinders described previously, having side edges defining spaces extending the length of the studs, drawn studs 206 are uninterrupted along the lengths thereof.

Figure 14:
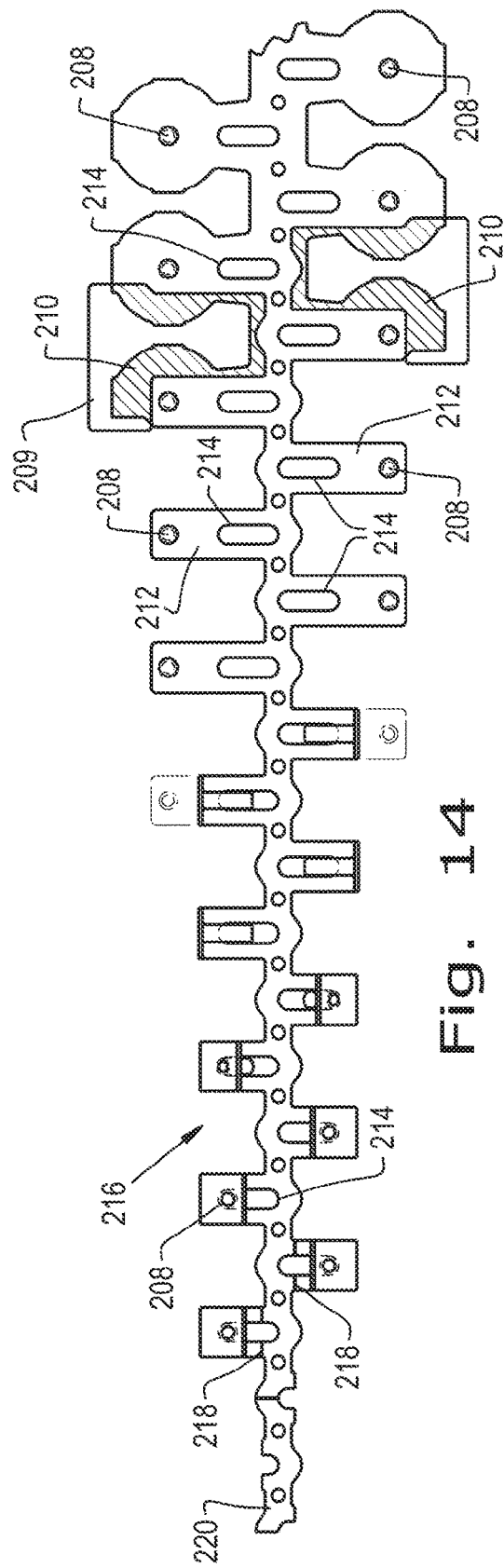
FIG. 14 is a top view of the material during further steps in the process represented in FIGS. 11-13.
Figure 15:
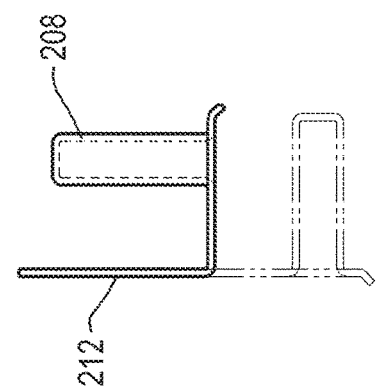
FIG. 15-19 are elevational views at various stages of the steps illustrated in FIG. 14.
Figure 16:
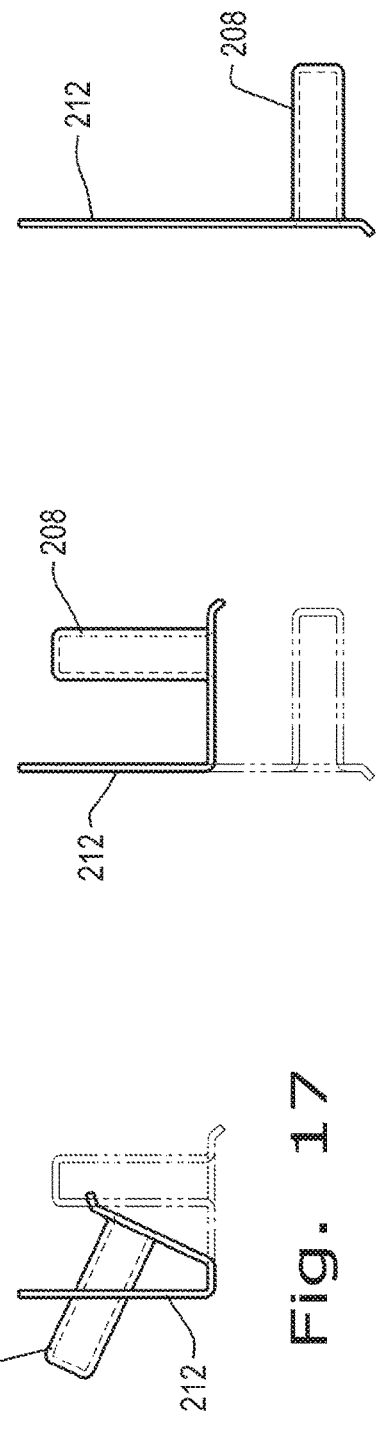
Figure 17:
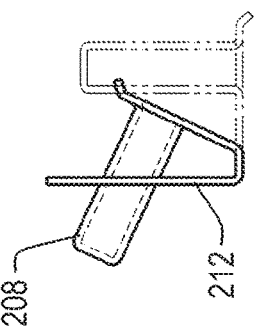
Figure 18:
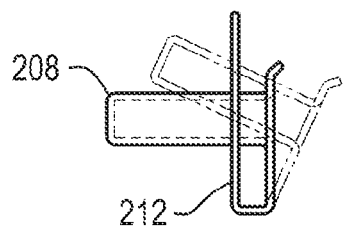
Figure 19:
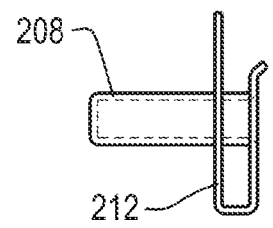

The shaped material depicted in FIG. 11 is further processed as shown in FIG. 14 to develop the final shape and configuration for the fastener, and to separate individual fasteners one from another. It should be understood that the process steps shown and described with respect to FIGS. 11 and 14 can be performed on a continuous length of material. The further processing can include a step or steps whereby the studs 206 are threaded to form threaded studs 208. A clamshell type thread former or other roll forming or thread forming or cutting processes can be used as one stage of the progressive process described herein.

In a die 209, excess material 210 in the preforms of the stud portions (shown in crosshatching) is removed in a series of operations to further shape and form the one-piece stud and clip. After trimming in the die 209, there is a connected series of generally rectangular bodies 212 having threaded studs 208 thereon. An elongated slot 214 is provided in each of the rectangular bodies 212 by stamping or punching, for example. Slots 214 can be formed at various stages of the process, such as, for example and not limitation, in the original shaping and forming steps depicted in FIG. 11, at the steps in which the excess material 210 is removed discussed above with respect to FIG. 14 or at some other step in the process.

Rectangular bodies 212, including areas of and around slots 214 as well as remaining material adjacent the bases of studs 208 are further manipulated to form the U-clip portion of the fastener. During final steps in the process, a series of bending operations (indicated at 216) fold the rectangular bodies 212 such that threaded studs 208 thereof are positioned in slots 214. FIGS. 15-19 are elevational views showing progressive stages of the bending process shown in top or plan view in FIG. 14 and indicated generally at 216. At a final shearing or cutting step, cuts are made as indicated by reference numeral 218, and individual one-piece stud and clips are separated from the remaining continuous band 220 to which they were connected.

Figure 20:
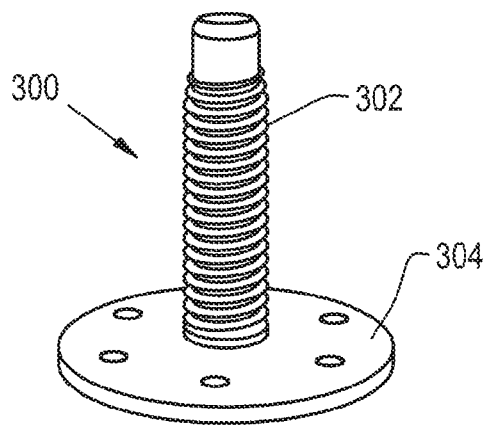
FIG. 20 is a perspective view of another embodiment of a one-piece stud and clip.

The one-piece stud and clips described herein can be provided in yet further modifications and variations. FIG. 20 depicts a one-piece stud and clip 300 having a threaded stud 302 and a flat base 304. One-piece stud and clip 300 can be manufactured by metal drawing processes as described above with respect to FIGS. 11-19. One-piece stud and clip 300 may be suitable for fastening to a component by adhesion using glue, welding or other suitable means.

Figure 21:
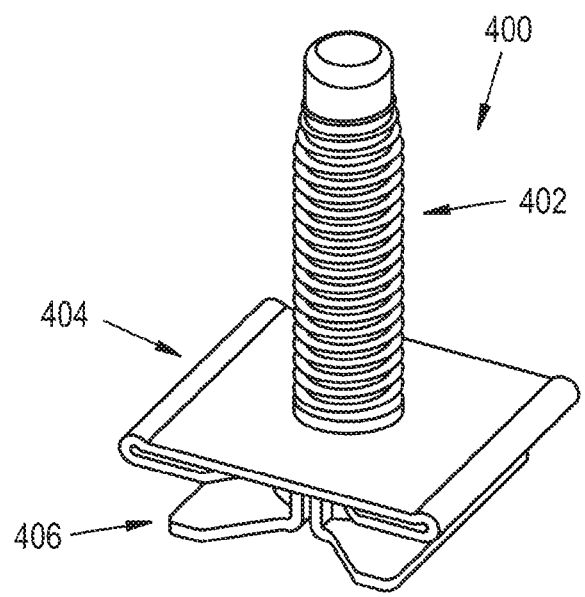
FIG. 21 is a perspective view of a further embodiment of a one-piece stud and clip.

FIG. 21 illustrates yet another embodiment of a one-piece stud and clip 400 having a threaded stud portion 402 and a clip portion 404. One-piece stud and clip 400 can be manufactured in accordance with any of the processes described above with additional material provided so that further bending establishes a pedestal portion 406 beneath clip portion 404.

It should be understood also that while threaded studs have been shown and described herein, stud portions of the fasteners in accordance herewith can be configured also without threads thereon. For example, a hole can be provided through a stud for engaging a cotter pin, spring pin or other securing element.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A process for making a one-piece stud and U-clip fastener from a flat sheet of material including steps of:
   shaping the sheet of material to form a flat blank comprising a first distal portion, a second distal portion, and a medial portion;
   forming a stud portion pre-form in the flat blank, the stud portion pre-form having a rounded edge;
   drawing an elongated stud portion from a section of the stud portion pre-form;
   removing the rounded edge from the stud portion pre-form; and
   bending the first distal portion or the second distal portion to form a clip portion of the one-piece stud and U-clip fastener, the clip portion having a U-shape integral with the elongated stud portion.

2. The process for making a one-piece stud and U-clip fastener of claim 1, including threading an outer surface of the elongated stud portion.

3. The process for making a one-piece stud and U-clip fastener of claim 1, including forming a slot in the stud portion pre-form, and said step of bending performed to position the elongated stud portion in the slot.

4. A process for making a one-piece stud and U-clip fastener from a flat sheet of material including steps of:
   shaping the sheet of material to form a flat blank comprising a first distal portion, a second distal portion, and a medial portion;
   forming a stud portion pre-form in the flat blank, the stud portion pre-form having a rectangular body that extends distally from the medial portion;
   drawing an elongated stud portion from a section of the stud portion pre-form;
   forming a slot in the rectangular body; and
   bending the stud portion pre-form to form the one-piece stud and U-clip fastener,
   wherein the step of bending positions the elongated stud portion in the slot.

5. The process for making a one-piece stud and U-clip fastener of claim 4, wherein forming the rectangular body of the stud portion pre-form includes removing a rounded portion of the stud portion pre-form.

6. The process for making a one-piece stud and U-clip fastener of claim 4, including threading an outer surface of the elongated stud portion.

7. The process for making a one-piece stud and U-clip fastener of claim 4, wherein the elongated stud portion extends through the slot.

* * * * *